United States Patent [19]

Work

[11] 3,765,665
[45] Oct. 16, 1973

[54] INTERNAL PIPE LINE-UP CLAMP
[75] Inventor: John S. Work, Tulsa, Okla.
[73] Assignee: American Pipeline Equipment Company, Tulsa, Okla.
[22] Filed: Dec. 29, 1971
[21] Appl. No.: 213,598

[52] U.S. Cl.................... 269/27, 29/468, 228/44, 269/52
[51] Int. Cl. ............................................ B23c 19/00
[58] Field of Search ............... 269/26, 34, 47, 48.1, 269/50, 51, 52; 228/44; 29/237, 464, 468

[56] References Cited
UNITED STATES PATENTS

| | | | |
|---|---|---|---|
| 3,633,813 | 1/1972 | Looney | 269/34 UX |
| 2,878,770 | 3/1959 | Work | 113/103 |
| 3,044,431 | 7/1962 | Cummings | 269/52 X |
| 3,227,349 | 1/1966 | Frederick | 228/50 X |
| 3,259,964 | 7/1966 | Engel | 228/49 X |
| 3,362,603 | 1/1968 | Bauer | 228/5 |
| 3,387,761 | 6/1968 | Pickard | 228/42 |
| 3,458,105 | 7/1969 | Valentine | 228/44 |
| 3,461,264 | 8/1969 | Nelson | 29/200 X |

Primary Examiner—Harold D. Whitehead
Assistant Examiner—Mark S. Bicks
Attorney—Robert E. Masa

[57] ABSTRACT

An internal pipe line-up clamp for properly aligning adjacent pipe sections prior to welding, is self powered for all of its operations. All components of the device are mounted in a body portion which includes a compressed air tank to supply the motive means for driving air motors which operate the various components including a pair of powered wheels which propel the device thru pipe sections. The device includes a latch which assures proper location with regard to two adjacent pipe sections and two sets of similar radially extending members which come into proper alignment, each set adjacent one end of each pipe section ready to be powered by hydraulic means to be urged against the internal surface of the pipe sections and to form the adjacent pipe sections into a similar and uniform radius. Air motors supply the power for the hydraulic pumps. Sealing means are provided for the area of the pipe section adjacent to the radially extending members so that vacuum may be supplied to this area in order to draw molten welding metal into the space between the pipe section to insure better weld. Also described are means to supply welding flux to the edges of the pipe sections being welded from a position between the radially extending members. Means are also provided to control the presentation of flux to the weld area in relation to the speed of welding.

9 Claims, 13 Drawing Figures

INTERNAL PIPE LINE-UP CLAMP

REFERENCE TO RELATED APPLICATION

This application is a modification of the invention described in U.S. Pat. No. 3,633,813 made by Robert L. Looney and John S. Work and assigned to the same assignee as this application.

BACKGROUND OF THE INVENTION

This invention relates to welding equipment, and more particularly to welding equipment useful for aligning and holding in alignment sections of pipe. Still more particularly, this invention relates to apparatus useful for aligning and holding in alignment adjacent pipe sections during welding operations and other related operations.

Occasionally, pipe sections, such as the large diameter pipe used for oil and gas transmission, are slightly "out-of-round" when the time comes to join adjacent pipe sections by welding. Traditionally, the custom was to sledge high spots in the end of the pipe sections so that the sections would meet properly. But, various devices have been invented to manipulate the ends of the adjacent pipe sections so that they are of substantial circular conformation, or at least so that the adjacent ends substantially meet along the entire circumference. Some of the devices being used presently are external clamps which are secured around abutting ends of adjacent pipe sections to squeeze high portions so that the sections substantially conform, and other devices currently being used are internal clamps which are positioned internally of pipe sections in a manner that they grasp adjacent pipe sections and have components which force "low spots" outwardly until the adjacent ends of the pipe sections conform. Generally, both types of pipe clamp are intended to hold the pipe sections in alignment until preliminary welding operations can be performed. Various kinds of internal line-up clamps are described in patents to Miller, U.S. Pat. No. 2,830,551, Forbes, U.S. Pat. No. 2,429,053, Forbes, U.S. Pat. No. 2,413,103, and in a patent in which one of the instant inventors was a co-inventor, Work, et al., U.S. Pat. No. 3,197,195. The primary object of this invention is to provide a device which will align adjacent pipe sections for a preliminary operation.

Another object of this invention is to provide a pipe line-up clamp which is relatively simple in construction, inexpensive to manufacture, and easy to use.

Another object of this invention is to provide an internal pipe line-up clamp which will permit positive alignment of adjacent pipe sections.

Still another object of this invention is to provide an internal pipe line-up clamp which will permit abutting ends of adjacent pipe sections to assume similar conformation.

Still another object of this invention is to provide an internal pipe line-up clamp which will permit adjacent sections of pipe to be substantially aligned so that an efficient welding operation may be accomplished.

Still another object of this invention is to provide an internal pipe line-up clamp which will quickly and automatically locate itself adjacent an end of a pipe section preparatory to an alignment operation.

Another object of this invention is to provide an internal pipe line-up clamp which is self propelled.

Another object of this invention is to provide an internal pipe line-up clamp which contains therein all necessary power components.

Another object of this invention is to provide a welding device which will present welding flux to an area in the vicinity of pipe being welded or to be welded.

Still another object of this invention is to provide a welding device which will present welding flux to an area adjacent a portion of pipe being welded in timed relation to the welding operation.

Another object of this invention is to provide an internal pipe line-up clamp which will present welding flux to an area adjacent a portion of pipe being welded.

Another object of this invention is to provide an internal pipe line-up clamp which will present welding flux to an area in the vicinity of a portion of pipe being welded in timed relation to the welding operation.

BRIEF DESCRIPTION OF THE DRAWINGS

Further objects and advantages of the invention will become apparent from the following description and claims, and from the accompanying drawings, wherein:

DESCRIPTION OF THE PREFERRED EMBODIMENTS

The internal pipe line-up clamp according to this invention is positionable within a section of pipe generally under its own power by operation or powered wheel components and is conducted thru that pipe section to a position within a second end thereof in juxtaposition to a second section of pipe which has been placed in substantial axial alignment adjacent the first pipe section. Upon further movement within the first pipe section, a forward portion of the line-up clamp enters the second pipe section and a latching component of the clamp engages the forward edge of the first pipe section indicating for the operator the proper position for the clamp. With the attainment of that position, the second section of pipe can be brought into close axial alignment with the first pipe section assuring proper alignment of both the pipe sections and the clamp. The roller means of a clamp, which are placed at the most advantageous position on a body member of the clamp, are adjustable to accommodate different dimensions of pipe. With the clamp in proper position the operator may manipulate suitable control means operably connected with power means in the clamp to cause adjustable means on the body member, as hereinafter more specifically described, including a plurality of radially extendable members arranged to engage the internal surface of the pipe, which means engage selectively a portion of the first pipe section and the second pipe section adjacent an end of each pipe section, and bear against the internal surface of the pipe sections to bring both pipe sections in proper circumferential alignment so that the welding operation may be easily and efficiently accomplished. Then, with the clamp in proper position for welding operation, vacuum means of the clamp cooperate with the adjustable means to effect drawing of weld metal into the space formed by adjacent end portions of the pipe sections when the clamp is in this proper welding position and as welding proceeds.

A modification of this invention includes flux back-up means to present welding flux to an area adjacent a portion of pipe to be welded or being welded. Such flux back-up means can be constructed to present flux to the weld area in relation to the progress of the welding operation.

Figure 1:
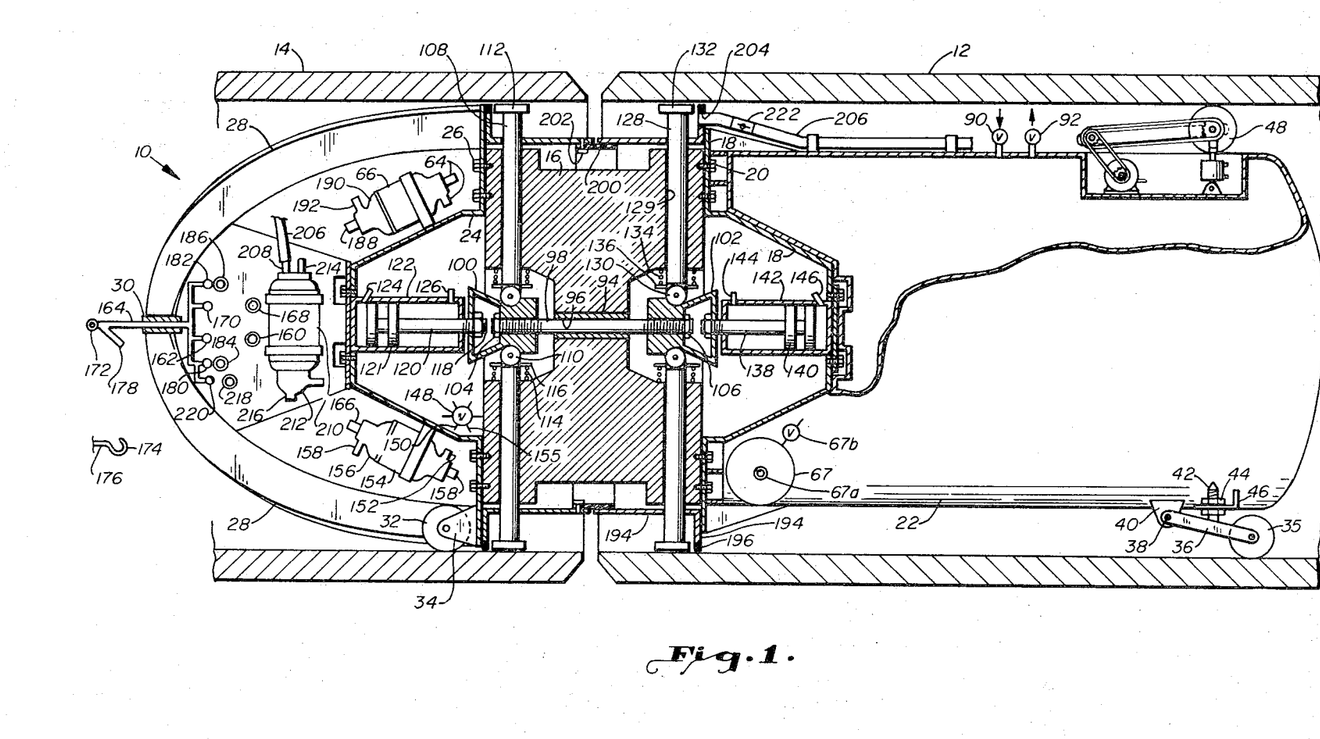
FIG. 1 is a side elevational view, partly in section, of an internal pipe line-up clamp according to this invention.

Referring now to the drawings in detail, FIG. 1 describes a pipe line-up clamp 10, generally, as it would be approximately in position internally of pipe sections 12 and 14. In this figure the pipe line-up clamp has already been placed in position within the pipe sections which are in substantially axial alignment, and the line-up clamp is approximately in a position to complete the line-up operation.

Figure 6:
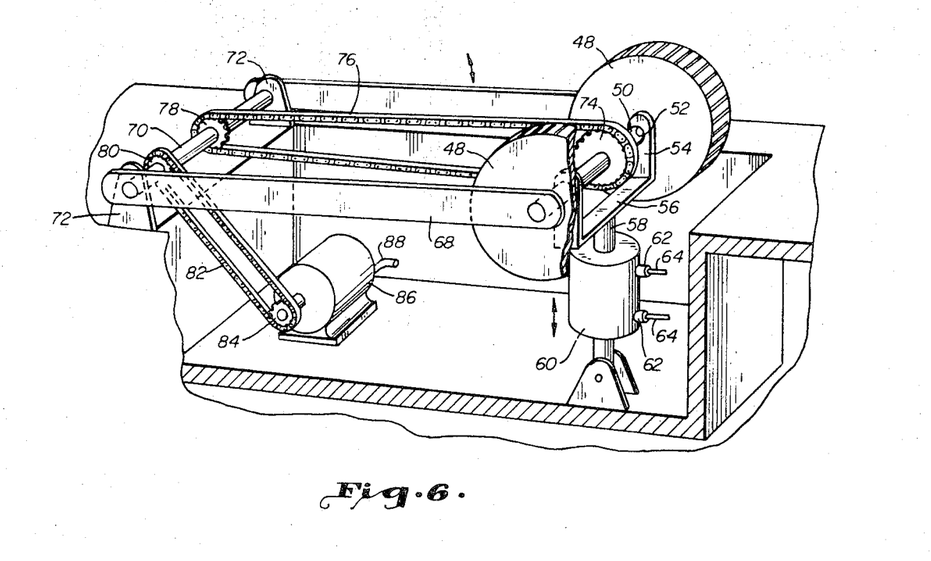
FIG. 6 is a perspective view of adjustable powered components of this invention which propel the device.

A body portion of this invention comprises a cylindrical centrally located ring member 16 to which a rearwardly extending frame portion 18 is attached by bolts 20 and to which in turn is secured cylindrical air tank 22 by any simple means such as welding, and a frontwardly extending frame portion 24 secured to the front part of ring 16 by bolts 26, to which in turn is secured by any suitable means a plurality of guide members 28 which are formed of flat pieces each attached at one end to frame 24 in circumferential disposition around frame 24 and each secured at a second end to a frame bushing 30. Arranged at suitable positions on frame member 24 are a plurality of carry wheels 32 positioned rotatably in housing 34. Housing 34 may be positioned on frame member 24 in any suitable manner so that it may be adjustable and tensionable to provide for more efficient line-up of the clamp within the pipe sections. Adjacent the rear end of air tank 22 is carry wheel 35 positioned rotatably in housing 36 which in turn is attached pivotally to shaft 38 passing thru brace member 40. An adjustable tension pin 42 passes adjustably thru cooperating housing member 44 secured to brace 46 on air tank 22. Pin 42 bears against housing 36 and includes spring means to provide for tensionable operation of wheel 35 against the internal surface of the pipe sections. Arranged on top of air tank 22 is means for providing powered axial movement of the line-up clamp, more clearly shown in FIG. 6. Wheel 48 is secured to axle 50 which passes thru an opening 52 in arm 54 secured to frame 56. Frame 56 is in turn attached to shaft 58 which can move slidably in a piston cylinder 60 and which shaft 58 has connected to it a piston member (not shown) which operates in the conventional manner to move the piston member and shaft 58 slidably up and down adjustably so that the tension applied to wheels 48 can be adjusted as desired. Conventional hydraulic fittings 62 provide for the entrance and exit of hydraulic fluid into the hydraulic cylinder 60 and against each face of the piston member within the cylinder. Hydraulic fittings 62 are suitably connected by means of lines 64 to the proper fittings on hydraulic motor 66. The complete manner of attaching the lines has been omitted for the sake of clarity in describing the invention. Hydraulic fluid reservoir 67 having a fill cap 67a and an outlet 67b is operatively connected to hydraulic motor 66 by suitable connections (not shown) and to other hydraulic components as hereinafter described. Shaft 50 rests bearably in frame member 68 which at the other end thereof cooperates bearably with shaft 70 which also passes thru suitable bearings in supports 72 secured to the air tank 22. Thus, frame member 68 acts to support and limit the movement of wheels 48. Wheels 48 are powered in order to provide for movement of the line-up clamp within the pipe sections, and the power means is provided by cooperation of pulley 74, chain 76, pulley 78, pulley 80, chain 82, pulley 84, and motor 86. Thus, pulley 74 is secured to shaft 50, and pulleys 78 and 80 are secured to shaft 70, so that with operation of motor 86, which is preferably an air motor, the rotation of pulley 84 will ultimately rotate wheels 48. The power to drive motor 86 is applied to the motor by means of air connection 88 which is attached by suitable connections to the air supply within air tank 22.

Air tank 22 is intended to be initially supplied with air pressure thru inlet valve and fitting 90 prior to the use of the line-up clamp by means of outside air supply, and upon being supplied with sufficient air pressure, is detached from the outside air supply and the compressed air within tank 22 then becomes available for use in supplying air to motor 86 thru connection of air connection 88 with outlet valve 92. Suitable conventional controls are provided to control the operation of air motor 86. Also, suitable conventional controls (not shown) are provided to control the operation of hydraulic cylinder 60 in positioning wheels 48 adjustably and tensionably against the internal surface of pipe sections as desired.

Figure 4:
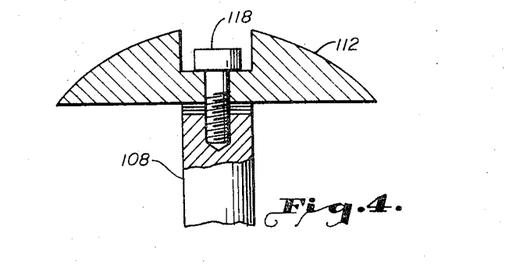
FIG. 4 is a front elevational view of a pipe engaging component, partly in section, of this invention.

As further shown in FIG. 1, ring member 16 has a centrally located opening 94 substantially coaxial with the body of the line-up clamp, wherein a bushing 96 is secured in which a shaft 98 is slidably disposed. Disposed on shaft 98 is a forward ram 100 and a rear ram 102 which operate slidably on shaft 98 and are retained on shaft 98 by means of nuts 104 and 106. Ram 100 operates to urge a plurality of push rods 208 radially outward toward the internal surface of the pipe line by cooperation of a conventional bearing member 110 with the outer surface of ram 100 in a manner that shoe members 112 on push rod 108 may be pushed into contact with the internal surface of the pipe section. A coil spring 114 is disposed around push rod 108 and bears against shoulder 116 to bias the push rod radially inward toward ram 100. FIG. 4 describes another view of the shoe members 112 and their mode of attachment to push rods 108 by means of a conventional machine bolt 118. Axial movement of ram 100 is accomplished by attachment of the ram 100 by suitable means such as welding or threaded attachment, to a piston rod 120 connected to a piston 121 operating slidably in a cylinder 122. Cylinder 122 is secured to front frame 24 by suitable means such as welding or by cooperation of nut and bolt members and includes outlets 124 and 126 which provide for proper entrance and exit of operating fluid which may be either air or oil. Similar components cooperate with ram 102, as push rods 128 moving slidably in cylindrical openings 129 in ring member 16 in the same manner as push rods 108 operate, and include bearings 130 which bear against the surface of ram 102. Operation of push rod 128 causes shoe members 132 attached thereto to bear against the internal surface of pipe section, and shoe members 132 are similar in construction to shoe members 112. Push rods 128 are biased radially inward toward ram 102 by means of coil springs 134 positioned between ring member 16 and shoulder 136. Ram 102 operates slidably on shaft 98 and is secured by any suitable means to piston shaft 138 connected to a piston 140 operating slidably in a hydraulic cylinder 142. Cylinder 142 has outlets 144 and 146 which provide proper entrance and exit of the fluid which manipulates the piston member slidably in the cylinder. Outlets 124, 126, 144, and 146 are connected to suitable fluid lines which in turn are connected to a multi-control valve 148 which has an inlet 150 connected to outlet 152 of pump 154 and an outlet 155 connected to inlet 158 of pump 154. Pump 154 is driven by an air motor 156 which receives its air power thru inlet 158 connected to suitable lines to air connection 160 which is arranged to be brought into communication with air connection 162 upon movement of rod 164 to a position placing connection 162 above connection 160 and rotation of rod 164 to a position placing connection 162 above connection 160 and rotation of rod 164 clockwise so that connection 162 contacts connection 160 and a valve member within connection 162 (not shown), which is normally closed, is brought to an open position so that air pressure flowing thru rod 164 is communicated to air connection 160 and consequently to inlet 158 bringing about the operation of air motor 156. By this operation then, shoe members 112 are brought into contact with the internal surface of the pipe section and sufficient force may be applied to the shoe members 112 so that the substantially abutting ends of pipe sections 12 and 14 are brought into substantial circumferential alignment. Upon operation of the device in this manner, air passing thru motor 156 is exhausted thru outlet 166 which is connected by suitable lines (not shown) to air connection 168 from where it is exhausted into the atmosphere. To retract shoes 112 from contact with the pipe section, rod 164 is rotated counter-clockwise bringing air connection 170 into operable contact with air connection 168 which movement opens an air valve (not shown) in air connection 170 to permit air to flow into air connection 168 thru outlet 166 which now becomes an inlet and this flow of air reverses the movement of air motor 156 and consequently the direction of the fluid pressure operating pistons 121 and 140. Rod member 164 is closed at the outer end thereof and at that end includes an eye member 172 arranged to cooperate with the hook member 174 at the end of a long rod 176 in a manner that rod 176 is passed to a pipe section ahead of the pipe clamp and connects hook 174 with eye 172 so that movement of rod 176 will properly position rod 164 to operate the clamp. Rod 164 also includes a quick connect valve portion 178 which can be easily and quickly connected to an outside source of compressed air to furnish the motive power for the air motors.

Rod member 164 also includes air connections 180 and 182 which include suitable valve components (not shown) and which can be brought into operable contact with air connections 184 and 186 upon slight forward movement of rod 164. Then, slight counter-clockwise rotation of rod 164 permits the valve in air connection 182 to become open allowing air pressure to flow into connection 186 and then thru suitable lines (not shown) to connection 188 of air motor 190 which operates hydraulic motor 66. In this arrangement the air connection 192 on motor 190 operates as an exhaust for the air driving the motor. To reverse the flow of air into motor 190 and consequently to reverse the hydraulic pressure generated by motor 66, rod 164 is rotated slightly clockwise so that connection 180 contacts connection 184. Then, a valve member (not shown) in connection 180 is opened and the air pressure flows thru connection 184 and by suitable lines connected to connection 192, air pressure flows into connection 192 and the rotation of motor 190 is thus reversed.

Figure 2:
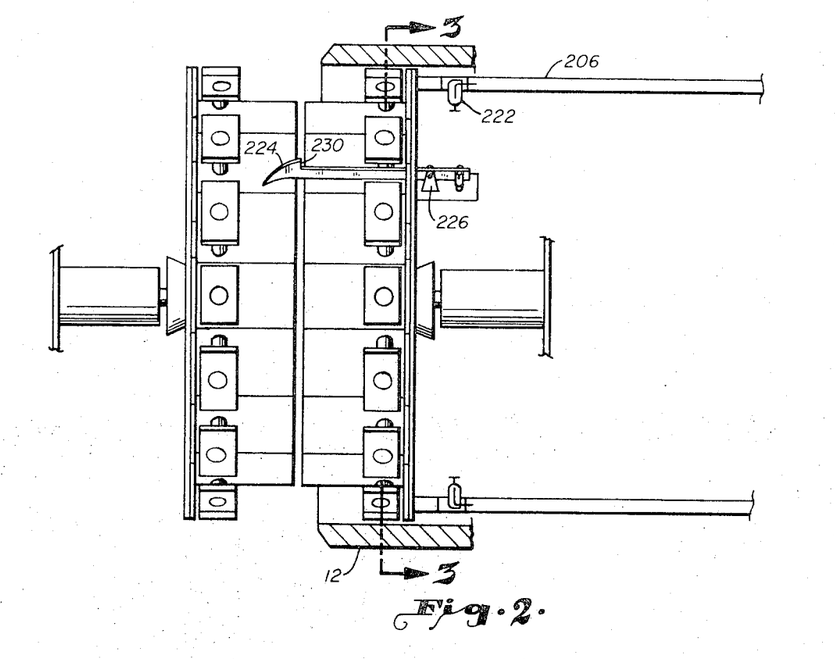
FIG. 2 is a side elevational view of pipe engaging components of this invention.
Figure 3:
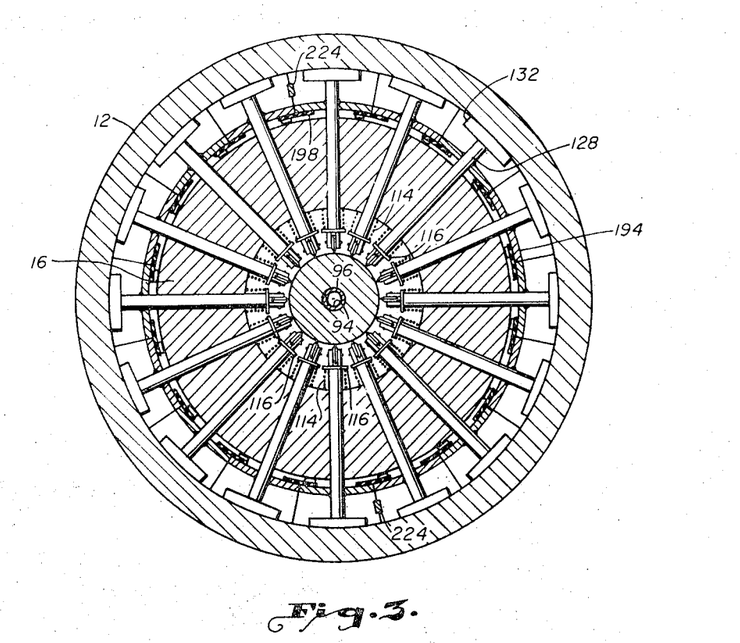
FIG. 3 is a cross sectional view of the pipe engaging components of this invention along the line 3—3 of FIG. 2.

FIGS. 1, 2, and 2 show a sealing means positioned circumferentially of a body portion of the clamp and adjacent the shoe members so that during the welding operation when the shoe members are in engagement with the internal surface of the pipe, a source of vacuum may be put into communication with the area between the sealing members and the surface of the pipe section to cause weld metal to be drawn into the slight space between the edge of the pipe sections to effect a smoother and better weld and to prevent those unwanted situations known in the welding industry as undercutting, burn through, and low root bead. A sealing flange 194 is disposed around each push rod 128, and as shown in FIGS. 2 and 3, the sealing flange moves radially with each push rod. Secured to an outer edge of each sealing flange is a flexible member 196 which comes into contact with the internal surface of the pipe section upon extension of each push rod, and in cooperation with other sealing flange serves to isolate a portion of pipe section for the welding operation. During movement of each sealing flange, there is a slight space between each adjacent flange at the outward extension of the flanges, and a rubber seal 198 is secured to one flange and rests substantially sealably on an adjacent flange to effect good sealing means during this outward and inward movement. Also, disposed circumferentially on the interior of the sealing flanges is a circumferential rubber seal member 200 which is secured to the forwardmost assemblage of sealing flanges 194 by suitable means as by brads 202 and operates slidably against a surface of the adjacent flange members. By this means, if there is unequal movement of flanges 194 in the two adjacent pipe sections, the sealing means will continue to effectively isolate that portion of the pipe sections contacted between the flexible members 196 so that the vacuum means associated with this sealing means can effectively cause the inflow of air into the space between the abutting edges of pipe sections during the welding operation. An opening 204 is formed in one of the sealing flanges 194 and a tube 206 is inserted therein with the other end of tube 206 connected with the vacuum side 208 of a vacuum pump 210 driven by an air motor 212. An exhaust port 214 is provided for the vacuum pump 210. Air motor 212 has an inlet 215 which is operably connected to an air connection 218 by suitable connections (not shown) in a manner that partial inward movement of rod 164 will cause air connection 220 on rod 164 to contact air connection 218 and then slight clockwise rotation of rod 164 will cause connections 218 and 220 to be in communication and a suitable valve in air connection 220 to be opened so that air pressure will pass from rod 164 thru connection 218 and into inlet 216 to cause operation of air motor 212. A timing valve 222 is inserted in tube 206 to time and control the flow of air which is brought into the isolated section of pipe thru the space between the abutting pipe edges by operation of vacuum pump 210 so that this flow of air, and consequently the amount of force applied to the weld metal to draw the weld metal into the abutting edges of pipe sections, can be made adjustable in relation to the circumferential space remaining between the abutting edges of the pipe section as the welding proceeds. That is, as the welding operation joining the abutting edges of the pipe sections proceeds, the portion of the pipe section edges remaining to be welded decrease. Therefore, the amount of vacuum pressure applied to this remaining space needs to be decreased to such an extent that the amount of vacuum force per unit of space remaining between the pipe sections should remain substantially constant. Otherwise, as the welding proceeded, the subsequent weld metal would be more strongly drawn into this space resulting in uneven welding. Preferably, timing valve 222 includes a clock-like mechanism which can be set immediately prior to each welding operation, and which can be set to control the time with which the valve component progresses from an open condition to a closed condition in tube 206, or even from any intermediate condition to a more closed condition.

It is conceivable that the control mechanism which operates the various air motors controlling vacuum and hydraulic pumps of this device could be operated by radio controlled means with a receiver mechanism installed in the device and a transmitter giving the proper signals externally operated, but for the purpose of down-the-right-of-way a rugged mechanism is required because of the usual rough treatment anticipated in down-the-right-of-way operations. Also, for those welding operations known as "yard" operations, the operative control of the device could be accomplished by placing the control mechanisms on a central control board or switchboard which may be positioned separately from the line-up clamp itself.

Figure 5:
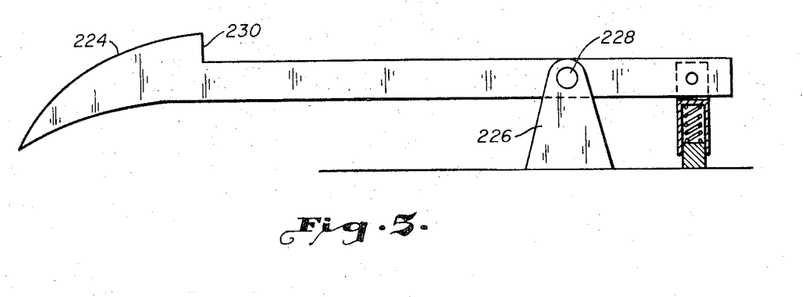
FIG. 5 is a side elevational view of a component of this invention useable for centering the device in propert position.

FIGS. 2 and 5 describe a latching apparatus which positions the line-up clamp properly in relation to the pipe sections. The latching apparatus includes a hook member 224 positioned swivelably on a support member 226 by means of a pin 228 connected to the hook member and passing thru support member 226 adjacent one end thereof. As the line-up clamp is positioned within first pipe section 12 and is caused to move toward the end of pipe section 12 preparatory to the welding operation, hook member 224 moves slidably along the internal surface of pipe section 12 until the end of the pipe section is reached. Then the biasing force applied to hook member 224 causes shoulder 230 to become engaged with the edge of the pipe section. At that time the line-up clamp can be stopped, and a second pipe section 14 is brought into its proper position abutting pipe section 12. The movement of pipe section 14 in abutment of pipe section 12 depresses hook member 224 out of its position of engagement with the edge of pipe section 12 and proper alignment of the pipe sections 12 and 14 is accomplished. If desired, proper actuation of the shoe members 132 can be had so that the line-up clamp will be firmly positioned in pipe section 12 in anticipation of the abutment of pipe section 14. Of course, after the completion of the welding operation, hook member 224 continues to be depressed so that it can readily be moved throughout the length of the welded pipe sections.

Figure 7:
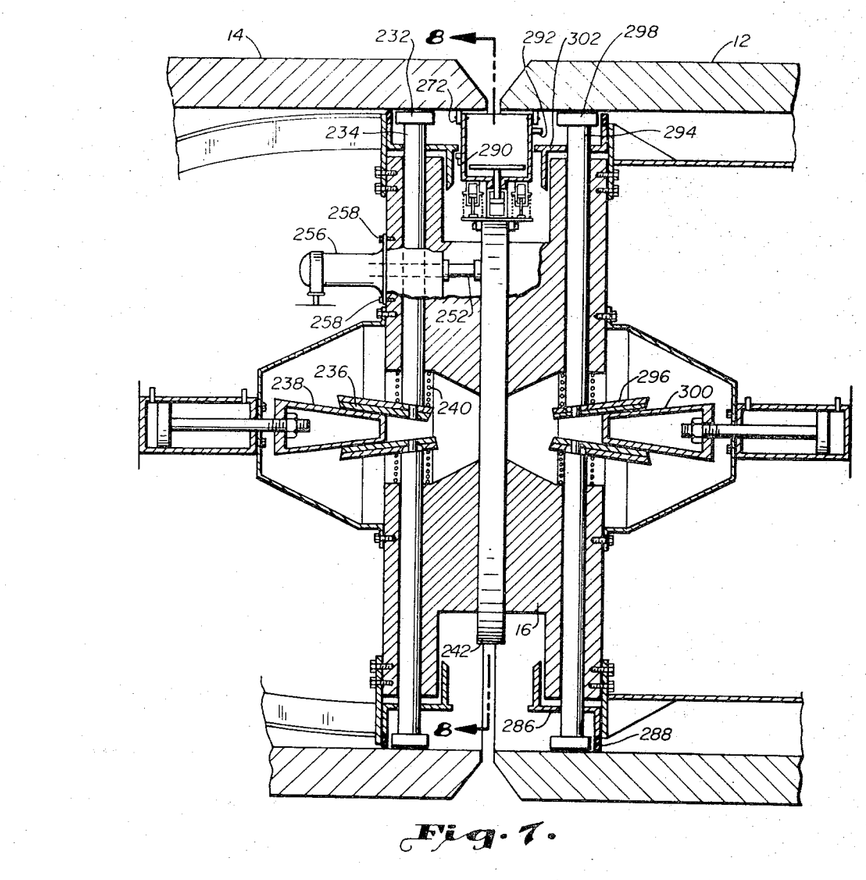
FIG. 7 is a fragmentary side elevational view, partly in section, of a modification of this invention describing one embodiment of flux back-up means.
Figure 8:
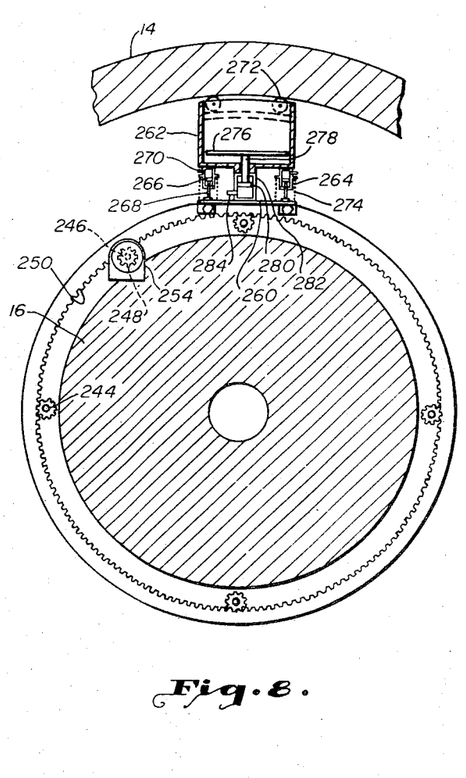
FIG. 8 is a fragmentary side elevational view, partly in section, taken along the lines 8—8 of FIG. 7.

FIGS. 7 and 8 describe another embodiment of this invention which also includes means to present welding flux to an area adjacent area being welded. The means described hereinafter in FIGS. 7, 8, and 9 to provide welding flux can be incorporated in various kinds of automatic welding equipment and not merely those devices used for pipeline welding operations. Welding flux serves many purposes, for instance, cleaning of the surfaces to be welded in order to enhance the cohesiveness of the weld metal, or adding fluidity to the weld metal. Other highly technical qualities are noted but do not need to be considered here. It is easily observed that proper use of the welding flux will assist in keeping too much of the molten metal from flowing up onto the underside of the metal being welded, and will assist in gripping the hot metal and keep the metal from burning thru. Welding flux also tends to keep the metal from cooling off too quickly as well as keeping an electric arc from jumping uncontrollably throughout the welding area.

In this embodiment shoe members 232 are positioned on push rods 234 which are attached to members 236 in a manner to move slidably in relation to ram 238. Ram 238 is secured to a piston rod in the same manner as rams 100 and 102 of FIG. 1. Thus, movement of ram 238 will position shoe members 232 against the internal surface of the pipe section. A coil spring 240 biases push rod 234 away from internal surface of the pipe section and toward ram 238. The flux back-up apparatus which presents a flux to the welding area is arranged to travel around the line-up clamp body in relation to the progress of the welding operation so that flux is presented to the area being welded at the proper time. To accomplish this result, a ring gear 242 is positioned around ring member 16 and preferably is held in place by a series of gear members 244, and is driven by a gear 246 having teeth 248 which mesh with teeth 250 of ring gear 242 which gear 246 is positioned on a shaft 252 operably connected to transmission 254 driven by motor 256. Motor 256 is secured to ring member 16 by means of conventional bolts 258. Means may be employed with motor 256 in order to adjust the speed of ring gear 242 so that it may coincide properly with the speed of the welding operation. Secured to ring gear 242 is a plate 260 upon which is positioned a flux container 262 by operable connection to an air cylinder 264 in which moves a piston 266 attached to a piston rod 268 which is further attached by suitable means to plate 260. Piston cylinder 264 has an air inlet 270 which is communicating with a conventional source of compressed air (not shown) by means of which air pressure can adjustably enter piston 264 to prescribed degrees so that container 262 can be adjustably positioned against the internal surface of the pipe sections to be welded. During the welding operation the flux container 262 moves smoothly along the internal surface of the pipe by operation of rollers 272. The coil spring 274 is positioned around piston cylinder 264 and is biased to hold the flux container 262 toward the ring gear 242. As the welding operation proceeds, flux is used from the flux container which was initially full of welding flux, and therefore a plate 276 secured to a rod 278 which is further attached to a piston 280 which moves slidably in a cylinder 282. Cylinder 282 has an air inlet 284 which is suitably connected to a source of compressed air by proper valving so that air may be allowed to enter and leave cylinder 282 as desired to controllably move plate 276 at a desired rate to maintain a supply of flux adjacent an area of pipe being welded.

FIG. 7 also describes a sealing member 286 having a flexible seal 288 which serves the same purpose and is operated similar to the sealing member described in FIG. 1. Vacuum means is included in the sealing member as with FIG. 1 so that the welding metal can be drawn into the space between the abutting edges of the pipe sections during the welding operation. In the embodiment of FIG. 7, flux container 262 includes a flange 290 and a flange 292 which assist in the movement of the flux container. Push rods 294 operate in conjunction with members 296 to operate shoe members 298 which operate in conjunction with ram 300 in the same manner that push rods 234 operate with shoe members 232 and ram 238. Thus, upon actuation of rams 238 and 300, sealing member 286 moves toward the internal surface of the pipe section because of its connection with the push rods 234 and 294, and in doing so, surface 302 of sealing member 286 contacts flange 292 and moves the flux container 262 toward the pipe section. Then, upon retraction of push rods 234 and 294, sealing member 286 contacts flange 290 and brings about downward movement toward the ring gear of flux container 262.

In another embodiment of the welding flux apparatus, the compressed air controlled biasing means described by cylinder 264, piston 266, and air inlet 270 communicating with a source of compressed air, may be eliminated and a biasing force causing the flux container 262 to be urged against the internal surface of the pipe section may be accomplished by means of a coil spring positioned in a suitable sleeve member and disposed suitably in cooperation with flux container 262 as by being positioned between flux containers 262 and ring gear 242. In this case, the flux container 262 is continually urged radially outward from the ring gear 242 and only shoulder members 290 would be necessary to control the movement of flux container 262 retractably from contact with the pipe section. In this situation, as the shoe members 232 and 298 are moved outwardly, flux container 262 is automatically moved outwardly also in conjunction with the shoe members.

Figure 9:
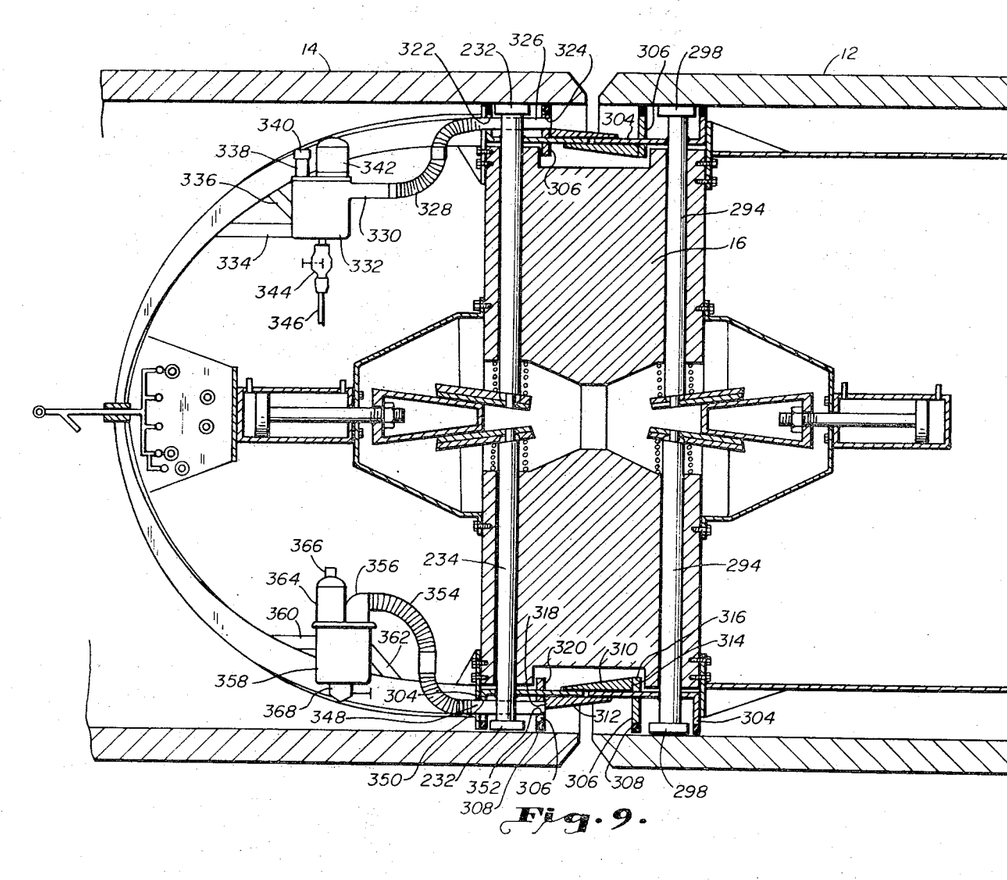
FIG. 9 is a fragmentary side elevational view, partly in section, of another modification of this invention.

FIG. 9 describes another modification of the invention in which a line-up clamp somewhat similar to the embodiment of FIGS. 7 and 8 is described but with a modified form of flux back-up means included in the clamp. In this embodiment, sealing member 304 includes an additional flange 306 having a flexible sealing portion 308 arranged for contact with the internal surface of the pipe sections. The space thus formed between adjacent sealing portions 308 provide a more limited space for the introduction and retrieval or welding flux. Also in this embodiment a double circumferential seal is provided comprised or members 310 and 312. Member 310 is secured at the back edge 314 to flange 316, and member 312 is secured at the back edge 318 thereof to flange 320. Thus, seal members 310 and 312 are disposed to move sealably and slidably over the inner and outer surfaces of sealing member 304 so that upon unequal movement of push rods 234 and 294, which may be necessitated by uneven conformation of the adjacent pipe sections, the sealing members may maintain a close seal with sealing member 304. Passing thru openings 322 and 324 in flange 306 is a tubular member 326 connected to flexible tubing 328 which is further connected to outlet tubing 330 of flux hopper 332. Flux hopper 332 is suitably mounted on the line-up clamp as by brackets 334 and 336 and also includes thereon a fill tube 338 covered by a filling cap 340, as well as a motor 342 which drives a screw component (not shown) positioned inside hopper 332 which is positioned to move welding flux from hopper 332 into tubing 330 and flexible tubing 328 on into the space between flanges 306. Motor 342 may be driven by one of the sources of compressed air previously mentioned hereinbefore as driving certain other of the air motors on the welding clamp, or it may be driven by a source of electric power from outside the welding clamp. Positioned on hopper 332 is a valve 344 communicating with line 346 which is in communication with a source of compressed air, either the air tank on the line-up clamp or by suitable means to a source of compressed air outside the clamp. By this means, if line 346 is in communication with a source of compressed air, valve 344 may be opened and flux can be blown from hopper 332 thru tubing 330 and 328 into the space between flanges 306. Also, line 346 may include a check valve which is in further communication with the source of compressed air so that line 346 may be in communication with means to be described hereinafter which removes welding flux from between flanges 306 and will cause the welding flux to be recycled in operation, with the welding clamp in proper position as described previously, and with pipe sections 12 and 14 brought into proper alignment, hopper 332 is initially filled with welding flux and actuation of motor 342 causes the flux to flow from hopper 332 into the space between flanges 306 and substantially filling the entire circumferential space between these flanges adjacent pipe sections 12 and 14. With the space between flanges 306 properly filled, the welding operation can proceed smoothly without significant loss of welding flux from between the abutting edges of the pipe sections. This embodiment may, of course, include the source of vacuum previously described which operates to draw welding metal into the area between the abutting edges of the pipe sections. With this area now full of welding flux though, proper screening will be necessary to prevent the withdrawal of welding flux thru this vacuum source.

Upon completion of the welding operation, the welding flux may now be removed from between flanges 306 as now described. A tubular member 348 is positioned thru opening 350 in seal member 304 and thru opening 352 in flange 306 and is connected to flexible tubing 354 which is further connected to inlet tubing 356 communicating with the interior of vacuum flux storage hopper 358. Hopper 358 is attached by suitable bracket members 360 and 362 to the body of the welding clamp. Positioned on hopper 358 is a vacuum pump 364 which can be operated either by an air motor driven by sources of compressed air as described previously, or driven by a source of electric power from a source outside the line-up clamp itself. Vacuum pump 364 includes a suitable exhaust valve 366. Storage hopper 358 also includes a closure member 368 which can be used either to remove flux from hopper 358 or which may be attached by suitable means to line 346 described above. In operation, upon the completion of the welding operation, the flux filling up the space between flanges 306 is removed by actuation of the vacuum pump 364 which causes the flux to accumulate in hopper 358. Then, closure member 368 may be opened and valve 344 may be opened, without actuation of motor 342, so that the welding flux may be blown from hopper 358 and recycled into hopper 332. If deemed necessary, a suitable screening valve may be included in tubular member 330 to effect better control of the recycling operation, but for most circumstances this should not be necessary.

Figure 10:
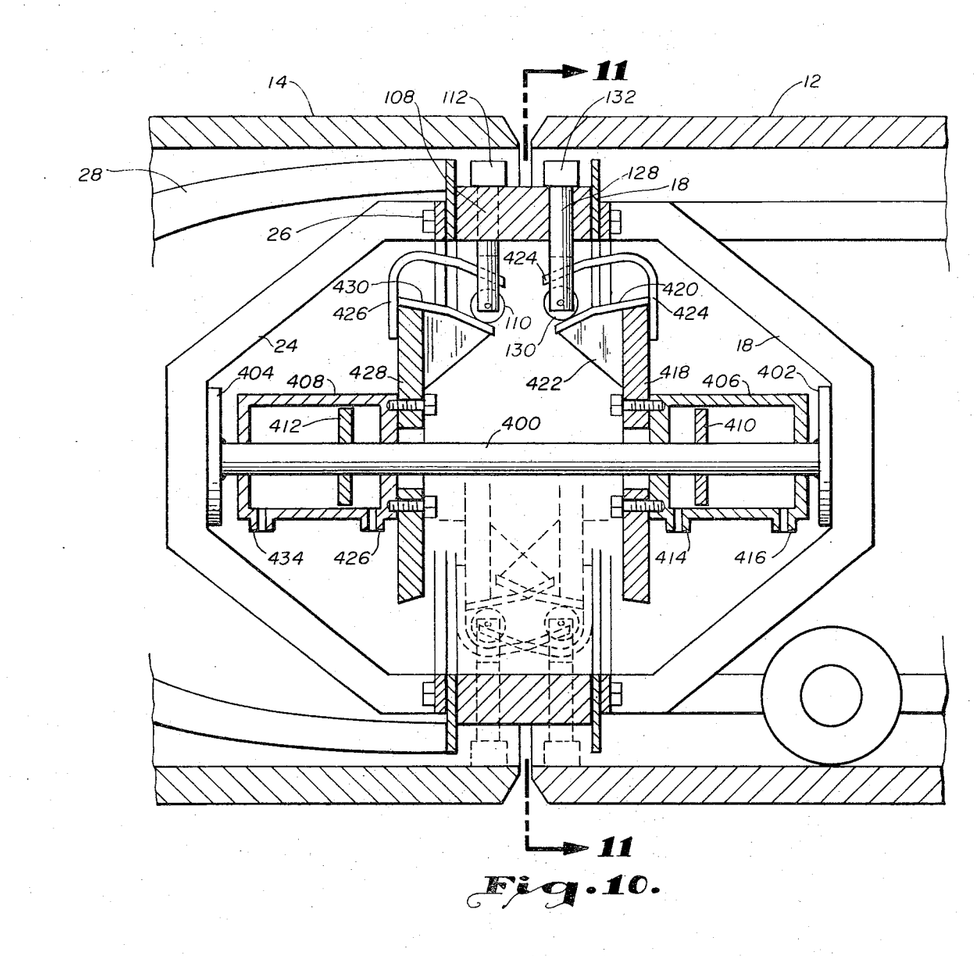
FIG. 10 is a fragmentary side elevational view, partly in section, of a modification of this invention, showing another embodiment of pipe engaging means.
Figures 11, 12, 13:
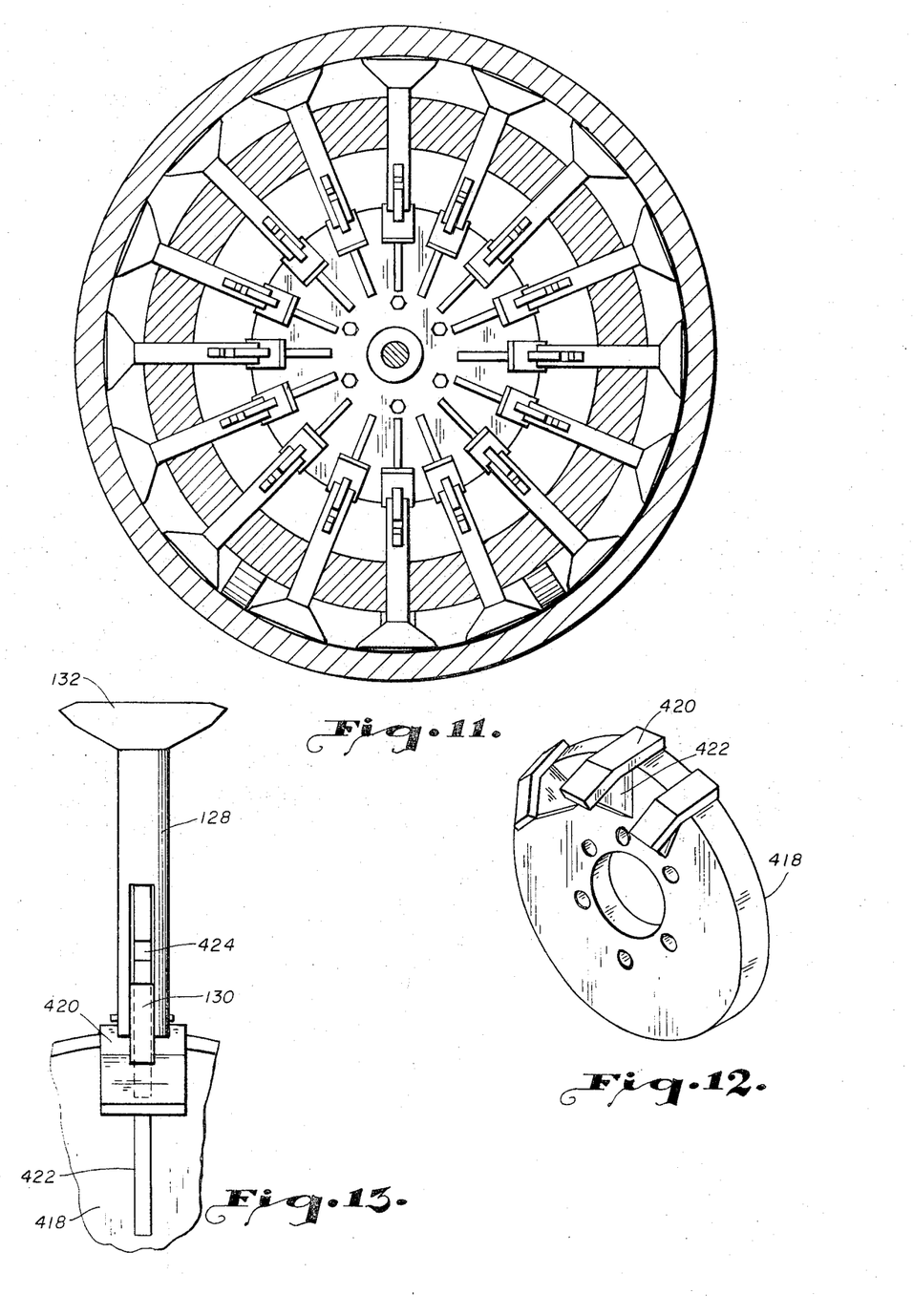
FIG. 11 is a cross sectional view of the pipe engaging components of this invention along the lines 11—11 of FIG. 10.
FIG. 12 is a perspective view of cam means for the pipe engaging components of this invention.
FIG. 13 is an enlarged front elevational view of a pipe engaging member of this invention.

FIG. 10 describes an alternate embodiment of the invention wherein shoe members 112 and 132 are urged outwardly by a modified type of cam member operating against rollers 110 and 130. In this embodiment, a rigid shaft member 400 is secured at each end to support frame 402 and 404, with support frames 402 and 404 further held securely on frame 18 and frame 24 respectively. Hydraulic cylinders 406 and 408 are positioned slidably on shaft 400 with shaft 400 passing sealably thru each cylinder 406 and 408. Each cylinder 406 and 408 encloses a piston member 410 and 412 respectively with each piston member 410 and 412 secured on shaft 400. Thus, hydraulic cylinder 406 includes fluid outlets 414 and 416 to permit entrance and exit of hydraulic fluid under pressure as desired to pressurize either side of piston member 410 upon suitable actuation of the valve system. In this manner, upon pressurization of fluid thru hydraulic fluid outlet 414, the volume of the cylinder compartment communicating with outlet 414 increases and cylinder 406 moves forward causing ring member 418 secured thereto to move forward also. Secured to ring member 418 are a series of cam members 420 supported by braces 422 which act upon roller 130 as the cylinder moves forward. Then, when the pressure is released from outlet 414 and hydraulic fluid under pressure enters outlet 416, the volume in the cylinder 406 communicating with outlet 416 increases and the cylinder is retracted along shaft 400 and retracting member 424 acts against roller 130 to urge roller 130 downwardly and consequently to retract shoe member 132 from its extended position.

In a similar manner, hydraulic cylinder 408 is urged forwardly along shaft 400 by pressurization of fluid thru outlet 426 causing ring member 428 which is secured to cylinder 408 to move forward also. Ring member 428 has attached thereto a cam member 430 supported by braces 432. Forward movement of cam 430 acts against roller 110 urging roller 110 and shoe member 112 upwardly against a pipe section. Then, release of pressure from outlet 426 and subsequent pressurization thru outlet 434 increases the volume of the compartment of cylinder 408 behind piston 412 to retract the cylinder and to cause retracting member 436 to act against roller 110 and urge roller 110 downwardly and consequently to retract shoe member 112 from its position against the pipe section. It is the purpose of this invention that cylinders 406 and 408 may be operated either in conjunction or separately by either a single set of controls or by multiple controls as desired. And, of course, the hydraulic system described includes conventional hydraulic seals where necessary.

As shown in shadow on FIG. 10, the cam members 420 and 430, and consequently shoe members 132 and 112, are offset so that in action they may effectively interlace and contribute to an improved geometric configuration of the pipe section when the shoe members are extended.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. An internal pipe line-up clamp, comprising:

A body member, including pipe-engageable roller means, an axial rod member secured at each end to said body member, a pair of axially operable members, each of which urges radially a plurality of radially extendible members toward the internal surface of said pipe in a first mode of operation, and each of which includes fluid cylinder means operable upon said rod member, and each of which further includes retracting means to urge radially inwardly said radially extendible members in a second mode of operation, and power means to operate said axially operable members.

2. An internal pipe line-up clamp as described in claim 1, wherein:

each of said axially operable members includes a plurality of radially oriented cam members each of which is positionable to actuate a one of said radially extendible members.

3. An internal pipe line-up clamp as described in claim 2, wherein:

each of said cam members has a planar surface in two adjacent planes against which said radially extendible members may bear.

4. An internal pipe line-up clamp as described in claim 3, wherein:

each of said cam members includes said retracting means.

5. An internal pipe line-up clamp as described in claim 4, wherein:

said retracting means includes an arm-like member disposable against a portion of said radially extendible member.

6. An internal pipe line-up clamp as described in claim 5, wherein:

said radially extendible members include roller means at an inner end thereof operable against said planar surfaces and said arm-like members.

7. An internal pipe line-up clamp as described in claim 6, wherein:

said fluid cylinder means is hydraulically operated.

8. An internal pipe line-up clamp as described in claim 7, wherein:
said radially extendible members include shoe members each having an outer surface having a major portion thereof of an arcuate configuration adjoining minor portions thereof of planar configuration.

9. An internal pipe line-up clamp as described in claim 1, wherein:
said radially extendible member include shoe members each having an outer surface having a major portion thereof of an arcuate configuration adjoining minor portions thereof of planar configuration.

* * * * *